Dec. 11, 1956   R. N. ECK   2,774,027
BRAKING CONTROL SYSTEM FOR ELECTRIC MOTORS
Filed March 22, 1954
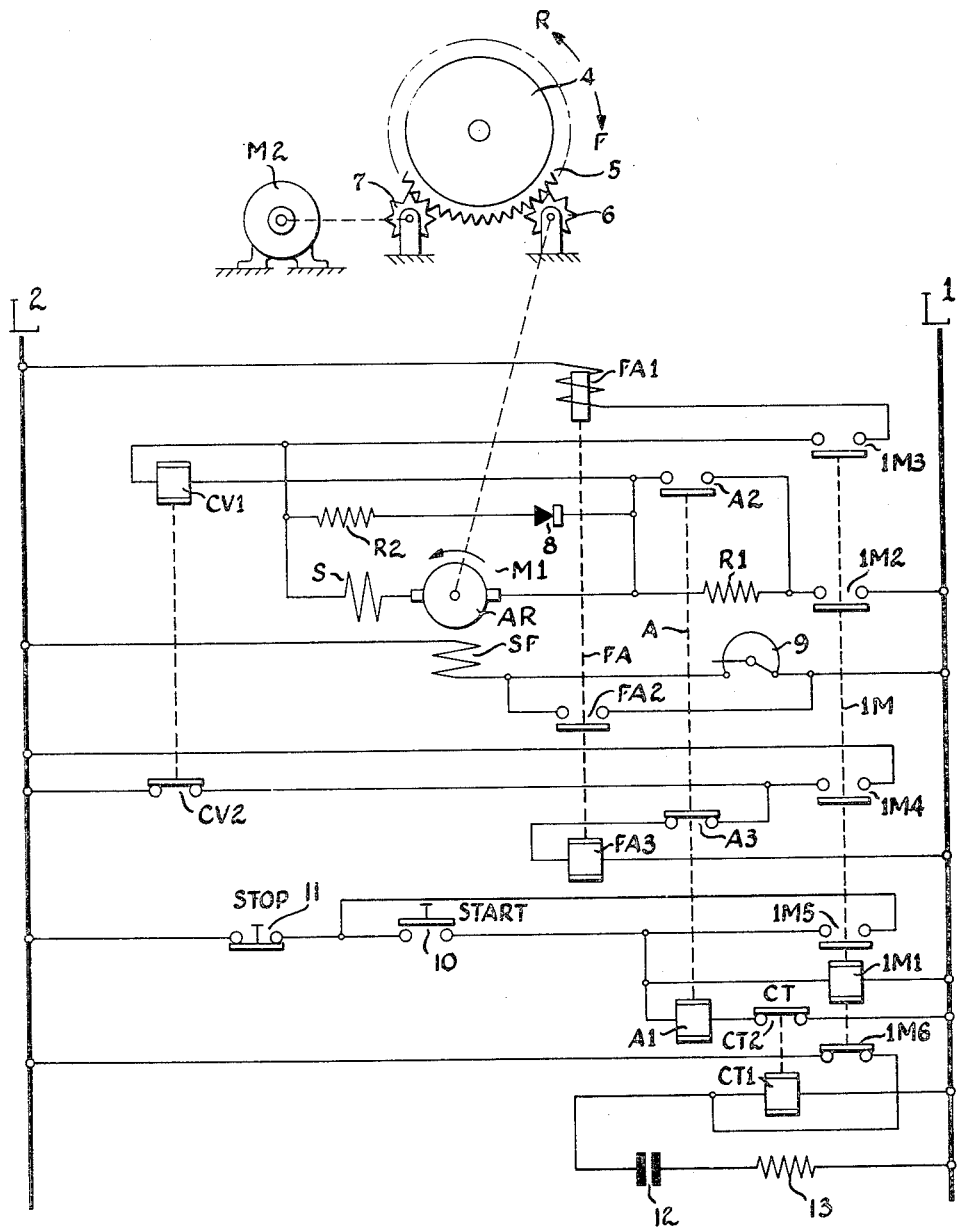
Inventor
Robert N. Eck
By H R Rather
Attorney …

United States Patent Office 2,774,027
Patented Dec. 11, 1956

2,774,027

BRAKING CONTROL SYSTEM FOR ELECTRIC MOTORS

Robert N. Eck, Whitefish Bay, Wis., assignor to Cutler-Hammer, Inc., Milwaukee, Wis., a corporation of Delaware Application March 22, 1954, Serial No. 417,684

5 Claims. (Cl. 318—379)

This invention relates to a braking control system for electric motors minimizing reverse rotation thereof and of loads normally driven thereby.

While not limited thereto, the present invention is particularly adapted for use with electric motors driving rotary kilns or other loads, exhibiting highly unbalanced load conditions tending to drive the motor in the reverse direction immediately following stopping.

Rotary kilns, such as those used in the manufacture of Portland cement, are usually driven by pairs of D. C. electric motors. These motors drive through individual pinions meshing with a large ring gear circumferentially fixed about the kiln. The usual control systems for such motors provide definite time armature acceleration, and field acceleration and deceleration control, but dispense with dynamic braking. It has been found that immediately following the attainment of rest condition of the kiln, following coasting from rated speed in the forward direction, that the load in the kiln is often so highly unbalanced that it causes the kiln to rotate in the reverse direction a partial revolution. Such reverse rotation of the kiln is undesirable, and consequently it is a primary object of the present invention to provide means for minimizing such reverse rotation with a minimum of added equipment.

In carrying out the invention, I provide a low resistance regenerative braking circuit across an armature of one of the load driving motors which is so arranged as to prevent current flow therethrough during motoring and coasting to rest, but which provides highly effective electrical braking action to minimize reverse rotation of the load and driving motors.

Other objects and advantages of the invention will hereinafter appear.

The accompanying drawing illustrates one preferred embodiment of the invention which will now be described in detail, it being understood that the embodiment is merely illustrative, and may be modified in respect of its details without departing from the scope of the appended claims.

In the drawing, a rotary kiln 4, having a ring gear 5 non-rotatably secured about its circumference, is adapted to be driven by a pair of electric motors M1 and M2 which are individually connected to pinions 6 and 7 meshing with ring gear 5. The control system for motors M1 and M2 are essentially identical and coordinated, so for the sake of simplicity the control system for only motor M1 will be described.

Motor M1, which in one preferred form is of the compound D. C. type, has an armature A mechanically connected to pinion 6, a series field winding S connected to the left-hand terminal of armature AR and a shunt field winding SF. The right-hand terminal of armature AR is connected in series with an accelerating resistor R1 and the latter is connectable to the high potential line L1 of a D. C. supply source through normally open contacts 1M2 of an electromagnetic contactor 1M. The left-hand terminal of field winding S is connectable through the normally open contacts 1M3 of contactor 1M to one end of a series coil FA1 of a field accelerating control relay FA. Coil FA1 is connected at its other end to low potential line L2 of said supply source and its associated movable armature is mechanically connected to normally open contacts FA2.

Normally open contacts A2 of an accelerating relay A, are connected so as to shunt resistor R1 out-of-circuit with armature AR upon closure of such contacts. The operating coil CV1, of a counter voltage relay CV is connected across the series combination of armature A and series field S of motor M1 and such coil is adapted to open the normally closed CV2 contacts whenever the motor counter voltage is above a given value. A resistor R2 and a half-wave rectifier 8 are connected across the series combination of series field S and armature AR of motor M1, rectifier 8 having the forward conducting relation shown with respect to line L1.

The resistance element of an adjustable resistor 9 is connected at one end to line L1 and at its other end in series with shunt field SF of motor M1 to line L2. The aforementioned contacts FA2 of relay F when closed connect shunt field SF directly across lines L1 and L2 for maximum energization of such winding. When contacts FA2 are open field SF is energized to a lesser extent depending upon the adjustment and total resistance of adjustable resistor 9.

Relay FA is provided with an electromagnetic coil FA3 which is connected at one end to line L1 and at its other end in series with normally closed contacts A3 of relay A and normally closed contacts CV2 of relay CV to line L2. The last mentioned end of coil FA3 is also connectable through the normally closed contacts A3 and normally open contacts 1M4 to line L2.

Contactor 1M is provided with an operating coil 1M1 connected at one end to line L1, and connectable at its other end through a normally open, "Start" switch 10 and a normally closed "Stop" switch 11. Contactor 1M is provided with normally open contacts 1M5, connected in a maintaining circuit around "Start" switch 10, and is further provided with normally closed contacts 1M6.

The operating coil A1 of accelerating relay A is connected with the normally closed contacts CT2 of a relay CT in parallel with operating coil 1M1 of contactor 1M. Relay CT is provided with an operating coil CT1 which is connected at one end to line L1 and at its other end in series with normally closed contacts 1M6 of contactor 1M. A capacitor L2 and a resistor 13 is connected in parallel across operating coil CT1 of relay CT.

The condition of the system depicted in the drawing is that occurring with the kiln 4 at rest and supply lines L1 and L2 deenergized.

The operation of the system will now be described.

Let it be assumed that a voltage is impressed across lines L1 and L2. Operating coil FA3 is then energized through the then closed contacts CV2 and A3 of relays CV and A, respectively 16, thereby closing contacts FA2 to connect shunt field SF directly across lines L1 and L2 for full energization. Operating coil CT1, and capacitor 12 and resistor 13 connected in parallel with coil CT1, are connected through the then closed contacts 1M6 of contactor 1M across lines L1 and L2. Consequently, coil CT1 is energized to effect opening of contacts CT2, and capacitor 12 ultimately becomes charged to line voltage.

If "Start" switch 10 is then momentarily closed operating coil 1M1 of contactor 1M will be energized to effect closure of contacts 1M2, 1M3, 1M4 and 1M5 and opening of contacts 1M6. The closure of contacts 1M5 provides a maintaining circuit for coil 1M1 after release of switch 10. Closure of contacts 1M2 and 1M3 connects the armature AR and series field S of motor M1, across lines L1 and L2 in series with accelerating resistor R1 and coil FA1, of relay FA. Thus motor M1 will commence to accelerate in the forward direction (which as depicted in the drawing may be assumed to be counterclockwise) under full shunt field energization and reduced armature voltage. The concurrent opening of contacts 1M6 interrupts the aforedescribed energizing connections for coil CT1 and capacitor 12, and the voltage across CT1 thereafter decreases at an exponential rate, depending upon the time constant of capacitor 12 and resistor 13. Consequently, contacts CT2 close after a timed interval to complete an energizing circuit for coil A1 of relay A from line L1, through contacts CT2, coil A1, contacts 1M5 and "Stop" switch 11 to line L2. Energization of coil A1 effects closure of contacts A2 to complete the shunt circuit around resistor R1 and thus increase the voltage across armature AR, and also effects opening of contacts A3 to afford deenergization of coil FA3 and consequent opening of contact FA2 to insert adjustable resistor 9 in series with shunt field SF.

With increased armature voltage and decreased shunt field energization motor M1 tends to accelerate at an increased rate, and draw increased armature current in the event the C. E. M. F. of the motor has not built up sufficiently. If the magnitude of increase in armature current is sufficiently great, coil FA1 will be energized to such a degree that it will effect reclosure of contacts FA2 to effect full voltage energization of shunt field SF thereby tending to reduce the armature current. During the acceleration of the load to rated speed contacts FA2 may repeatedly open and close under the control FA1 to maintain the armature current within acceptable limits until the motor C. E. M. F. builds up sufficiently to hold it down. This type of shunt field acceleration control is of course well known.

When the C. E. M. F. of the motor rises sufficiently coil CV1 of relay CV becomes energized to open contacts CV2. The opening of contacts CV2 has no purpose during acceleration and running at rated speed, but is useful in deceleration control as will hereinafter be explained.

Now let it be assumed that motors M1 and M2 are driving kiln 4 at rated speed and it is desired to stop the same. This is accomplished by momentary opening of "Stop" switch 11 which deenergizes coil 1M1 of contactor 1M and coil A1 of relay A. Consequently, contacts 1M2 and 1M3 open to interrupt the power connections through armature AR, contacts A2 reopen to reinsert accelerating resistor R1 in circuit with armature AR, contacts A3 reclose to ready a circuit for coil A3, contacts 1M4 and 1M5 reopen, and contacts 1M6 reclose to reenergize coil CT1 to thereby reopen contacts CT2. Motor M1, thereupon decelerates under reduced shunt field energization. When the motor C. E. M. F. drops to a low value at which coil CV1 becomes deenergized, contacts CV2 reclose to again complete the energizing circuit for coil FA3 of relay FA through the then closed contacts A3 of relay A. The reenergization of coil FA3 effects reclosure of contacts FA2 to afford full energization of shunt field SF. During deceleration to rest flow of current through rectifier 8 and resistor R2 is blocked.

If after kiln 4 has come to rest following deceleration in the forward direction, a highly unbalanced load condition exists in the kiln which tends to rotate the latter in the reverse direction, the motors M1 and M2 would consequently tend to be rotated in their reverse direction (clockwise as depicted in the drawing) at considerable speed. When motor M1 starts to rotate in the reverse direction, the resistor R2 and rectifier 8 afford a low resistance, regenerative braking circuit across the series combination of armature AR and series field S. Thus the braking action against rotation in the reverse direction will be appreciable with the shunt field SF at condition of full voltage energization.

The rectifier 8 is selected to withstand a counter current conducting voltage somewhat in excess of normal line voltage, and resistor R2 is selected to have relative low ohmic value. With rectifier 8 so selected, there will be essentially no current flow therethrough during forward operation of motor M1. If the strength of shunt field SF were permitted to be fully energized before the C. E. M. F. died down to a relatively low value during coasting of the motor M1 to rest, rectifier 8 would have to be selected to withstand a counter-current voltage considerably in excess of normal line voltage. The counter-voltage relay CV with its operating coil CV1 and contacts CV2 connected as aforedescribed insures that during coasting to rest of motor M1 shunt field SF will not become connected for maximum energization until the C. E. M. F. is reduced to a relatively low value, thereby permitting rectifier 8 to be selected for withstanding a counter-current conducting voltage only slightly in excess of normal line voltage.

Where two mechanically coupled motors, such as the motors M1 and M2, are used it has been found that it is usually only necessary to provide one such motor with the aforementioned regenerative braking circuit and counter-voltage relay. Whereas such regenerative braking circuit comprising resistor R2 and rectifier 8 is shown connected across the series field S and armature AR of a compound type D. C. motor, similar braking action will be afforded if such resistor and rectifier are connected across the motor armature of a straight shunt field type of D. C. motor.

I claim:

1. In combination, a source of D. C. voltage, a D. C. motor having a shunt field, means for selectively connecting the armature of said motor across said source for running in the forward direction and disconnecting the same for stopping, a circuit including a unidirectional conducting device connected in parallel with the armature of said motor, said device being so poled as to provide flow of braking current only when said motor rotates in the reverse direction, means providing maximum energization of said shunt field for starting and another given lower level of energization a predetermined interval following starting, and means in circuit with the last mentioned means and responsive to armature counter-voltage to prevent establishment of maximum energization connections for said field by said last mentioned means until said motor counter-voltage decreases below a given level.

2. The combination according to claim 1 wherein said motor is provided with a series field in circuit with its armature, and wherein said circuit including said unidirectional device is connected in parallel with both said series field and said armature.

3. The combination with a source of D. C. voltage and a shunt field D. C. motor driving a load device that may be unbalanced to such a degree following stopping in the forward direction that it tends to drive the motor in the reverse direction, of means for selectively connecting the armature of said motor across said source for running in the forward direction and disconnecting the same for stopping, a circuit including a half-wave rectifier connected in parallel with said armature, said rectifier being so poled as to provide flow of braking current only when said motor rotates in the reverse direction, means providing maximum energization of said shunt field for starting and another given lower level a predetermined interval following starting, and means in circuit with the last mentioned means and responsive to the armature counter-voltage to prevent establishment of maximum energization connections for said field by said last mentioned means until said motor counter-voltage decreases below a given level.

4. The combination according to claim 3 wherein the means controlling the energization level of said shunt field comprises a resistor in series with said field, and an electromagnetic relay comprising contacts in shunt relation with said resistor, a first control winding energized upon starting to close said contacts and deenergized a predetermined interval following starting and a second control winding in circuit with the motor armature to effect closure of said contacts wherein the armature current rises above a predetermined level regardless of the condition of said first control winding.

5. The combination according to claim 3 wherein the last specified means comprises an electromagnetic relay having its operating coil connected in shunt with the armature of said motor, and contacts in circuit with the means controlling the level of energization of said shunt field.

References Cited in the file of this patent
UNITED STATES PATENTS

| | | |
|---|---|---|
| 2,461,919 | Powell | Feb. 15, 1949 |
| 2,482,453 | Ankenman | Sept. 20, 1949 |